(12) United States Patent
Hunter

(10) Patent No.: US 7,287,486 B2
(45) Date of Patent: Oct. 30, 2007

(54) RECEPTACLE FOR USE IN THE CARE AND MAINTENANCE OF LIVING THINGS WITH SWIVEL MOUNT AND METHOD THEREFOR

(75) Inventor: Lynn Hunter, Parker, CO (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 10/908,948

(22) Filed: Jun. 1, 2005

(65) Prior Publication Data

US 2006/0272586 A1    Dec. 7, 2006

(51) Int. Cl.
*A01K 61/02* (2006.01)
*A01K 31/00* (2006.01)

(52) U.S. Cl. .................. 119/57.8; 119/428

(58) Field of Classification Search ........... 119/416, 119/428–435, 51.01, 452, 459, 464, 52.1, 119/52.2, 57.8, 57.9, 61.57, 72, 470; 248/317, 248/318, 289.11; 403/78, 60
See application file for complete search history.

(56) References Cited

U.S. PATENT DOCUMENTS

| 107,802 | A | * | 9/1870 | Osborn ................ 119/459 |
|---|---|---|---|---|
| 1,258,703 | A | * | 3/1918 | Perkins ................ 119/428 |
| 1,628,973 | A | * | 5/1927 | Harley ................ 482/87 |
| 2,661,178 | A | * | 12/1953 | Ferris ................ 248/317 |
| 2,801,611 | A | * | 8/1957 | Decker ................ 119/57.8 |
| 4,207,839 | A | * | 6/1980 | Barry ................ 119/57.9 |
| 4,570,891 | A | * | 2/1986 | Kaplan ................ 248/341 |
| 4,821,681 | A | * | 4/1989 | Tucker ................ 119/51.01 |
| 5,033,411 | A | * | 7/1991 | Brucker ................ 119/52.2 |
| 5,088,448 | A | * | 2/1992 | Gladding ................ 119/786 |
| 6,155,205 | A | * | 12/2000 | Coates ................ 119/57.9 |
| 6,199,925 | B1 | | 3/2001 | Alba |
| 6,758,010 | B2 | * | 7/2004 | Wright ................ 47/67 |
| 2004/0118352 | A1 | * | 6/2004 | Adams et al. ........ 119/57.9 |

* cited by examiner

*Primary Examiner*—Teri Pham Luu
*Assistant Examiner*—Joshua Michener
(74) *Attorney, Agent, or Firm*—Jacobson Holman PLLC

(57) ABSTRACT

A receptacle for the care and maintenance of living things has a housing with an interior, and a lid that is securable thereto by rotation in a first direction and detachable therefrom by rotation in a second direction. A swivel member associated with the lid permits the lid to freely rotate relative to a portion of the swivel member. The receptacle has a suspension member with a first end portion securable to the swivel member and a second end portion securable to a support member so that when the assembled receptacle is suspended from the support member, the lid can rotate relative to the swivel member without being detached from the housing.

9 Claims, 2 Drawing Sheets

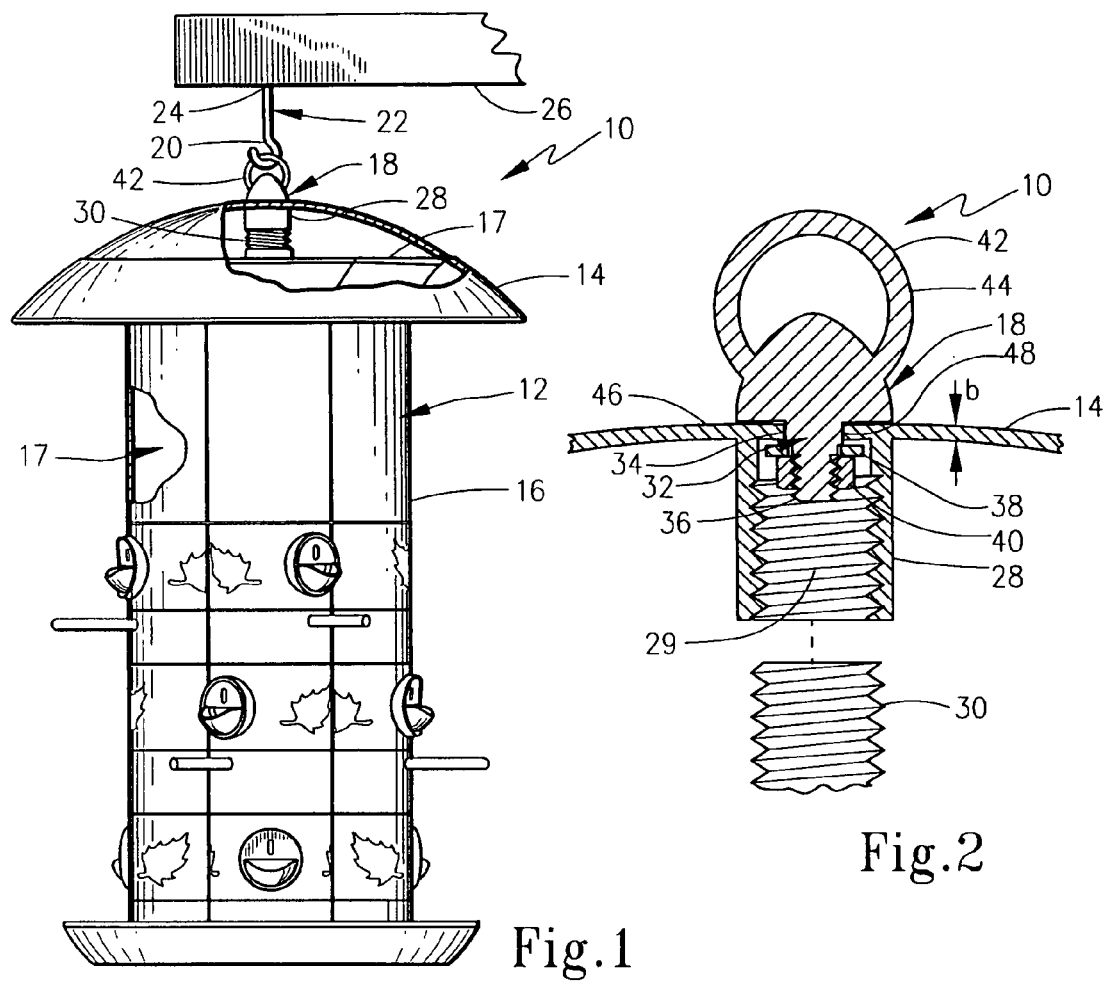
Fig.1
Fig.2
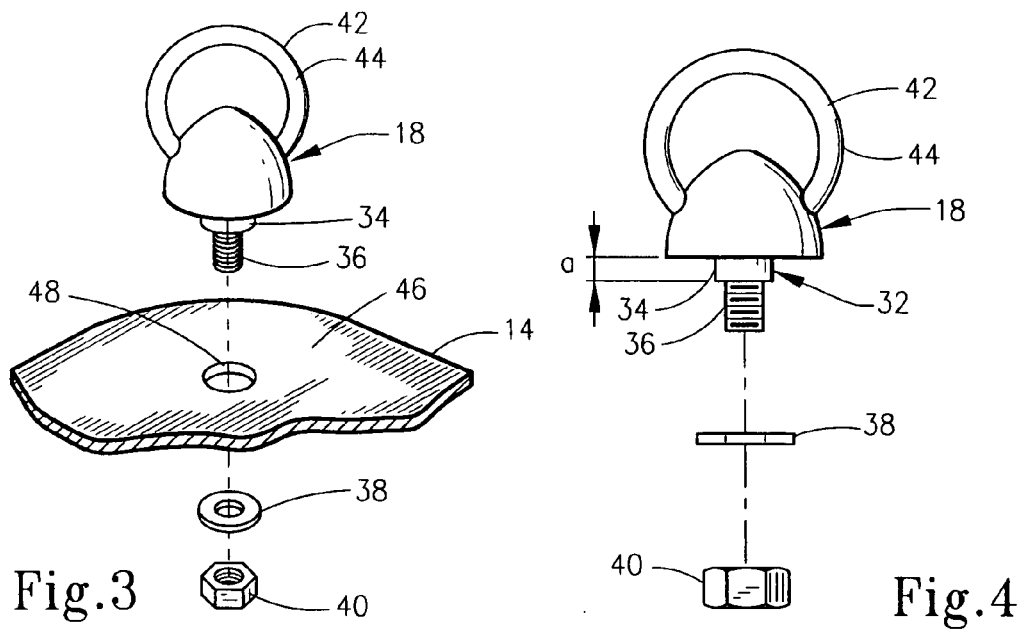
Fig.3
Fig.4

RECEPTACLE FOR USE IN THE CARE AND MAINTENANCE OF LIVING THINGS WITH SWIVEL MOUNT AND METHOD THEREFOR

BACKGROUND OF THE INVENTION

1. Field of the Invention

Embodiments of this invention relate to suspending assemblies from a support member wherein the assemblies are free to rotate relative to the support member without altering the state of the assembly. These assemblies may be varied in purpose, such as for providing food, shelter or other care facilities for animal or insect species. One principal aspect of these embodiments is the provision of facilities for wild birds.

2. Description of the Prior Art

Bird-watching is a highly prevalent past-time in both urban and rural areas. The world is full of birds of numerous varieties in an astounding array of colors and designs. Many people enjoy viewing birds of various types, and an industry has grown up around products directed to improving the ability of persons to get close to birds. On one hand, many people venture into the outdoors, where binoculars and spotting scopes may be utilized to better view various birds in their natural habitats. Such an approach requires a certain degree of skill, however, in finding and spotting various species of birds. Another approach utilizes various means of attracting birds to one's residence or a desired viewing location, such as adjacent a home porch or window, where birds may be viewed at one's leisure.

In particular, the art of using bird feeders, bird baths, nesting facilities and the like has arisen to attract birds of various types to one's home. Different types of feeders have been developed, which each dispense foodstuffs that are preferred by a selected variety of bird which a person might desire to view. For example, seeds, grains, suet, and nectars are common foodstuffs that can be dispensed by a selected type of feeder. Bird houses are also provided to entice wild birds to nest is an area where they may be observed and enjoyed. Likewise, care facilities such as bird baths are provided to encourage birds to frequent a desired location.

Many people hang such feeders and bird houses from porches, backyard trees or eves, so as to be able to watch various brightly colored birds arrive and depart, hovering or sometimes perching at the feeder in the interim to feed. Oftentimes the structure is suspended by either a wire, rope, chain or rod to prevent unwanted creatures such as squirrels, mice, snakes and the like from getting to the food or the feasting birds. This type of suspension also simplifies the mounting and removal of the structure for the purposes of cleaning, adding food, or storing when not in use.

Many of these structures are built with a top, or lid, which is removable from a housing in order to gain access for refilling with feed or for cleaning out an abandoned nest. One means of securing the lid to the housing of the structure is by a threaded assembly such that the lid is screwed onto, or off of, the housing. Typically a wire, or the like, is connected at one end to a supporting member, such as a tree limb or protruding beam, and connected at the other to the top of the structure. The wire is attached to the lid by a hook or loop. A problem with this is that the action of the wind can cause the structure to rotate which, in turn, causes the wire to twist, subsequently causing it to spin the feeder in the opposite direction. This induced rotational motion also applies torque to the lid which can cause it to unscrew itself from the body of the feeder leading to the feeder dropping to the ground.

Accordingly, it can be seen that there remains a need to provide a new and improved means and methods for suspending facilities for the care and maintenance of living things, such as wild birds, so that rotation of the receptacle is minimized to prevent inadvertent uncoupling of the receptacle from the suspending wire. The disclosed embodiments of the present invention are directed to meeting these needs.

SUMMARY OF THE INVENTION

One aspect, according to one or more of the disclosed embodiments, is to provide for an improved suspension assembly for a receptacle that is to be suspended from a supporting member.

Another aspect, according to one or more of the disclosed embodiments, is to provide for an improved suspension assembly for a receptacle that is free to rotate relative to a supporting member without causing the receptacle to disconnect itself from the supporting member or to become inadvertently disassembled.

In accordance with this, the embodiments of the present invention relate to a receptacle for use in the care and maintenance of living things. In addition, this disclosure teaches embodiments of a swiveling finial for such receptacle and a method of supporting a receptacle.

In the general form of the embodiments, the receptacle includes a housing with an interior opening at its top which is covered by a lid when the receptacle is in the assembled state. The lid is adapted to attach to the housing in a manner such that the lid is rotated relative to the housing in one direction in order to secure the two in the assembled state and in the opposite direction to detach them from one another. A swivel member is secured to the lid in a manner that allows the lid to freely rotate with respect to a portion of the swivel. A portion of the swivel member has a hanger element affixed to it which is adapted to be connected to one end of a suspension member. The other end of the suspension member is attached to a support member when the receptacle is in the suspended state.

One embodiment of the swivel member includes a stub shaft which extends through a central hole in a top panel of the lid and which is non-compressively secured to the lid with a threaded nut affixed to a threaded portion of the stub shaft. A hanger element, attached to this swivel member, is adapted to connect to a first end of the suspension member. This hanger element may be in the form of an eyelet. In this manner the lid and housing are able to freely rotate with respect to the swivel member without dismounting the lid from the housing. The lid may be rotatably mounted onto the housing by way of a threaded cylindrical shell which is mounted onto the lid and mates with an upwardly projecting threaded post on the housing.

Another embodiment of the swivel member includes a female pin which is adapted to receive a male pin in order to affix the two pieces to the lid. This is accomplished by sizing the male pin to fit through a central hole in the lid and to tightly fit within an axial bore in the female pin. In this manner the male and female pins securely capture the lid. The female pin also includes a shank portion which is sized to receive an annular washer and allow its rotation with respect to the lid. The annular washer includes a hanger element, e.g. an eyelet, for attachment to the first end of the suspension member. The male pin may also include a second axial bore which is adapted to receive a threaded post extending upwardly from the housing in order to rotationally connect the lid to the housing in the previously described manner.

According to another aspect of the present invention, an embodiment of a swiveling finial is disclosed with this finial being adapted to secure to a receptacle that is to be suspended from a support member. In this embodiment, the swiveling finial includes a female pin that has a female shank with the first axial bore therein. A male pin is included with the male pin having an enlarged head and male shaft portion sized and adapted to be mateably received in the first axial bore so that the female pin and the male pin may be secured together thus connecting to the receptacle. An annular washer is rotatably disposed on the female shank so that it may freely rotate with respect thereto. A hanger element is then secured to the annular washer so that the hanger element may swivel with respect to the female pin. This hanger, as disclosed, may conveniently be an eyelet. The male pin may also have a second axial bore formed therein that secures the lid of the receptacle to the housing of the receptacle thereby to form an assembled unit.

In addition to these structural embodiments, this application discloses a method of supporting a receptacle that is used in the care and maintenance of living things. This method includes any of the steps inherent in the described structures. Broadly, for example, the method may include the step of securing a swivel member onto the lid of receptacle so that the lid may freely rotate with respect to at least a portion of the swivel member without demounting the lid from the housing. The method then includes the step of mounting the lid on the housing by rotation in a first direction and suspending the receptacle from the support member by securing a first end portion of the suspension member to the swivel member and a second end portion of the suspension member to the support member. In the disclosed embodiments, the swivel member is secured centrally of the lid. The receptacle may be a birdfeeder so that the method can include the steps of demounting the lid from the housing by relative rotation in a second direction opposite the first direction, placing a selected bird feed in the interior of the housing and thereafter mounting the lid and the housing together by relative rotation in the first direction.

These and other aspects of the present embodiments will become more readily appreciated and understood from a consideration of the following detailed description when taken together with the accompanying drawings, in which:

BRIEF DESCRIPTION OF THE DRAWINGS

FIG. 1 is a side view, with a partial cut-away, of a receptacle according to a first embodiment of the present invention;

FIG. 2 is a sectional side view of a swiveling finial, a portion of the lid and a portion of the housing according to the first embodiment of the invention;

FIG. 3 is an exploded view in perspective showing the first embodiment of the swiveling finial and a portion of the lid of the first receptacle;

FIG. 4 is an exploded side view of the first embodiment of the swiveling finial;

DETAILED DESCRIPTION OF THE PREFERRED EMBODIMENTS

Figures 5, 6, 7, 8:
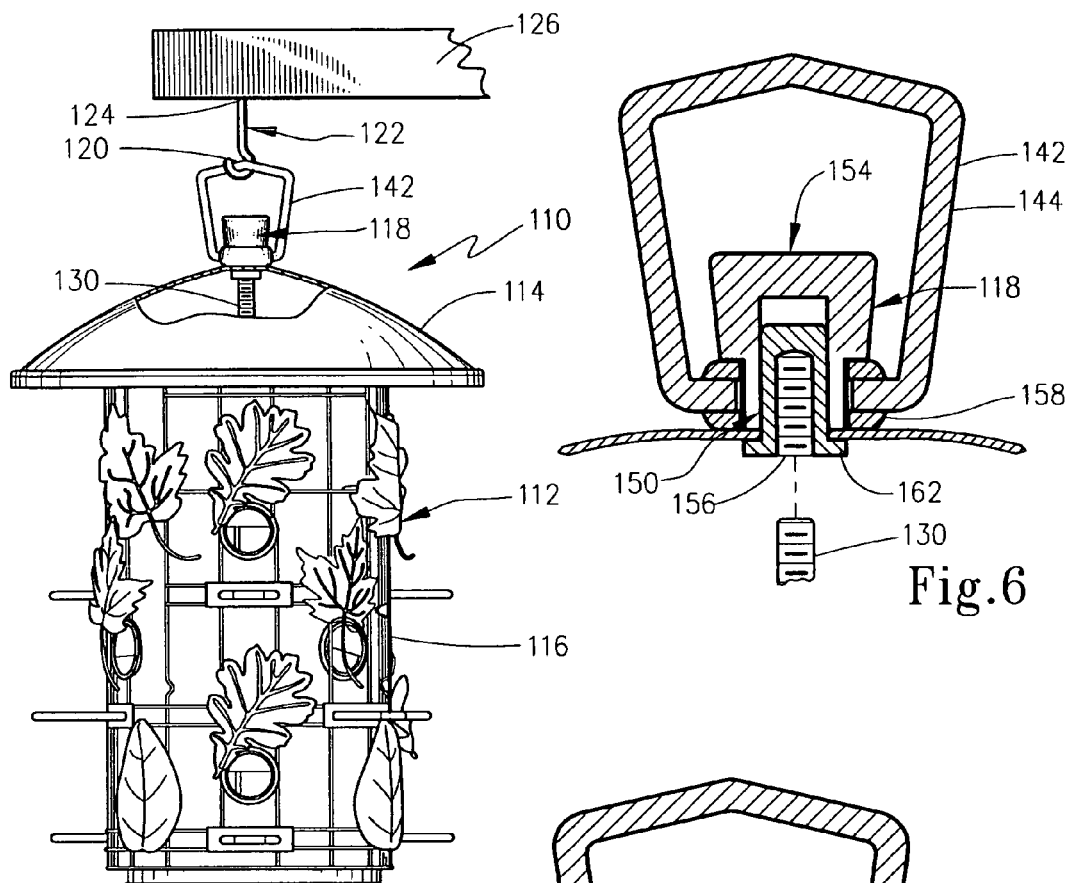
FIG. 5 is a side view with partial cutaway of a second embodiment of the present invention.
FIG. 6 is a sectional side view of a swiveling finial, a portion of the lid and a portion of the housing according to the second embodiment of the invention.
FIG. 7 is an exploded view in perspective showing the second embodiment of the swiveling finial and a portion of the lid of the second receptacle.
FIG. 8 is an exploded sectional side view of the swiveling finial according to the second embodiment of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention generally concerns a receptacle for the care and feeding of animals which is intended to be suspended from a supporting member such as a tree limb, beam, or roof overhang and is designed to rotate freely. The receptacle includes a housing with an interior opening at its top which is covered by a lid when the receptacle is in the assembled state. A swiveling finial is attached to the lid in a manner that allows its free rotation with respect to the lid. The lid is adapted to attach to the housing in a manner such that the lid is rotated relative to the housing in one direction in order to secure the two in the assembled state and in the opposite direction to detach them from one According to a first embodiment of the present invention, a first receptacle 10, is shown in FIG. 1. Here, receptacle 10 is shown to be in a suspended state as an assembled unit 12 that includes a lid 14 and housing 16. The housing 16 has an upwardly opening interior 17. A swivel member 18 is secured to the lid 14, as described below. It should be appreciated that the swivel member 18 is depicted in the drawings as a swiveling finial for lid 14. However, any suitable swivel member would be functional whether constructed as a finial or simply as a rotating fastener.

With continued reference to FIG. 1, a first end portion 20 of a suspension member 22 is secured to swivel member 18, and a second end portion 24 of suspension member 22 is secured to a support member 26. The support member may be a beam, tree limb, or other structure of choice. The suspension member 22 specifically shown in FIG. 1 is a hooked rod, however, one skilled in the art can appreciate that a chain, wire or rope could equally well be used as suspension member.

FIG. 1 also shows that lid 14 has a downwardly depending cylindrical shell 28 (also shown in section in FIG. 2) connected to the lid 14. Shell 28 forms a threaded socket adapted to mate with an upwardly projecting threaded post 30 on the housing 16. Rotation of the lid 14 relative to the housing 16 in a first direction will join the lid 14 and housing 16 as an assembled unit while rotation in the second, or opposing, direction will demount the two pieces. As will be described in the following, the swivel member 18 acts to allow free rotation of the assembled unit 12 without causing the housing 16 to uncouple itself from the lid 14.

A sectional view of a portion of lid 14 including the swivel member 18 and post 30 is shown in FIG. 2. Here it can be seen that the swivel member 18 includes a stub shaft 32 with an unthreaded portion 34 and a threaded portion 36, a washer 38 and a threaded nut 40 (see also FIGS. 3 and 4). A hanger element 42, shown here in the form of an eyelet 44, is affixed to the swivel member 18 and, as seen in FIG. 1, is adapted to be attached to a first end portion 20 of the suspension member 22. Hanger element 42, of course, could take different forms such as a hook, as is known in the art of connectors.

It can be seen in FIGS. 2 and 3 that the lid 14 includes a top panel 46 with a circular hole 48 through which the stub shaft 32 extends. FIG. 2 also shows the previously mentioned downwardly extending cylindrical shell 28 with internal threading 29 integral to the lid 14 and an end portion of an upwardly projecting threaded post 30 which rotatably mates with the shell 28 in order for the lid 14 and housing 16 to be assembled.

Exploded views of the swivel member 18 are shown in FIGS. 3 and 4. As is depicted in these figures, the stub shaft 32 of the swivel member 38 passes loosely through the hole 48 and connects with washer 38 and nut 40. The dimensioning of the salient features of the swivel member 18 are depicted in FIGS. 2 through 4. In order for the swivel member 18 to be attached to the lid 14 in a non-compressive, freely rotatable manner the length "a" of the unthreaded portion 34 of the stub shaft 32 is greater than the thickness "b" of the top panel 46 of the lid 14 and the outer diameter of the unthreaded portion 32 of the stub shaft 32 is less than the diameter of the hole 48. A washer 38 and threaded nut 40 are mounted onto the threaded portion 36 of the stub shaft 32 and serve to prevent the stub shaft 32 from pulling out of the hole 48 when the receptacle 10 is in the suspended state. A washer 38 may be used in this embodiment to serve as a means of further assuring the free rotation of swivel member 18 and lid 14 as well as to better distribute the stresses induced by the suspension of the assembled unit 12.

According to a second embodiment of the present invention, a receptacle 110 is shown in FIG. 5. In FIG. 5, the assembled unit 112 includes a lid 114 and a housing 116, and it is shown in the suspended state. A swivel member 118, e.g. a swiveling finial, is secured to the lid 114 and is mounted onto a first end portion 120 of a suspension member 122 the other end of which, the second end portion 124, is attached to a support member 126. FIG. 5 also shows an upwardly projecting threaded post 130 (seen in FIG. 6 as well).

A sectional view of a portion of the lid 112 including the swivel member 118 and top panel 146 of the lid is shown in FIG. 6 along with post 130. Here it can be seen that the swivel member 118 includes a male pin 150 which is matably received within a first axial bore 152 located in the shank 166 of a female pin 154 in order to capture the lid 114 and support it in the suspended state. The swivel member 118 also includes a hanger element 142, shown in the form of an eyelet 144, which is attached to annular washer 158. FIG. 6 also shows a portion of the housing's threaded post 130 which mates with a second axial bore 156 within the male pin 150 in order for the lid 114 and housing 116 to be connected by relative rotation as previously described.

FIG. 7 shows an exploded view of the swivel member 118 along with the a portion of the top panel 146 of the lid 114 with hole 148, and FIG. 8 shows a side view of the exploded swivel member 118. Referring to the dimensioning shown in FIGS. 7 and 8, female shank 166 has an outer diameter "c", and the annular washer 158 has an inner diameter "d" that is greater that "c" to allow free rotation of washer 158 on shank 166. Female pin 154 has a cap element 164 from which female shank 166 axially extends, and a first axial bore is located in shank 166. The first axial bore 152 in shank 166 has a diameter "e".

The male pin 150 has a male shaft portion 160 with outer diameter "f" and an enlarged head 162. Male pin 150 includes a second axial bore 156 with threads that mate with those of the threaded post 130 in order to provide the previously discussed means for connecting the lid 114 and housing 116. The dimensions of diameter "e" and the diameter "f" are selected such that male shaft portion 160 may be press fit in bore 152 in a secure manner to produce an acceptable strength press fit based on the materials chosen for these parts. It may be noted, here, that the enlarged head 162 of male pin 150 will capture the lid 114 between the male pin 150 and the female shank 166 (as depicted in FIG. 6).

A method of supporting a receptacle that is used in the care and maintenance of living things is contemplated by the structural embodiments described above. This method includes any of the steps inherent in these described structures. Broadly, for example, the method may include the step of securing a swivel member onto the lid of receptacle so that the lid may freely rotate with respect to at least a portion of the swivel member without demounting the lid from the housing. The method then includes the step of mounting the lid on the housing by rotation in a first direction and suspending the receptacle from the support member by securing a first end portion of the suspension member to the swivel member and a second end portion of the suspension member to the support member. In the disclosed embodiments, the swivel member is secured centrally of the lid. The receptacle may be a birdfeeder so that the method can include the steps of demounting the lid from the housing by relative rotation in a second direction opposite the first direction, placing a selected bird feed in the interior of the housing and thereafter mounting the lid and the housing together by relative rotation in the first direction.

Accordingly, the embodiments of the present invention have been described with some degree of particularity. It should be appreciated, though, that the scope of the claimed invention is set forth in the following claims such that the exemplary embodiments should not limit the scope of the invention. That is, is should be clearly understood that modifications or changes may be made to the exemplary embodiments of the present invention without departing from the inventive concepts contained herein.

What is claimed is:

1. A suspendible receptacle for the care and maintenance of living things, comprising:
    an assembled unit including a lid having a swivel hole therein and a downwardly facing threaded socket, and a housing having an upwardly opening interior and an upwardly projecting threaded post, said lid and said housing connected together by relative rotation in a first direction and disconnected by rotation in a second direction between said socket and said post; and
    a swivel secured to said lid through said swivel hole such that said lid can rotate with respect to said swivel without disconnecting said lid from said housing, said swivel including a shaft with an unthreaded portion such that a length of said shaft unthreaded portion is more than a depth of said swivel hole and a diameter of said shaft unthreaded portion is less than a diameter of said swivel hole.

2. The receptacle according to claim 1 wherein the assembled unit is selected from a group consisting of bird houses, bird feeders, butterfly feeders, and bird baths.

3. The receptacle according to claim 1 wherein said swivel includes a hanger element adapted to suspend the receptacle.

4. The receptacle according to claim 3 wherein said hanger element is an eyelet.

5. The receptacle according to claim 1, said swivel shaft further comprising a threaded portion and a threaded nut adapted to mount on said threaded portion thereby providing a non-compressive connection for securing said lid on said swivel.

6. The receptacle according to claim 1 wherein said lid includes a downwardly facing cylindrical shell.

7. The suspendible receptacle according to claim 1, wherein said swivel includes a shaft threaded portion, and said receptacle further comprises an annular washer rotably disposed on said shaft unthreaded portion and a threaded nut mounted on said shaft threaded portion so as to provide a rotatable, non-compressive connection for securing said swivel to said lid.

8. The suspendible receptacle according to claim 1, wherein a top portion of said swivel includes a hanger for communicating with a suspending device.

9. A suspendible receptacle for the care and maintenance of living things, comprising:

an assembled unit including a lid having a swivel hole therein and a downwardly facing threaded socket, and a housing having an upwardly opening interior and an upwardly projecting threaded post, said lid and said housing connected together by relative rotation in a first direction and disconnected by rotation in a second direction between said socket and said post;

a swivel secured to said lid through said swivel hole such that said lid can rotate with respect to said swivel without disconnecting said lid from said housing, said swivel including a shaft with a threaded portion and an unthreaded portion such that a length of said shaft unthreaded portion is more than a depth of said swivel hole and a diameter of said shaft unthreaded portion is less than a diameter of said swivel hole; and an annular washer rotably disposed on said shaft unthreaded portion and a threaded nut mounted on said shaft threaded portion so as to provide a rotatable, non-compressive connection for securing said swivel to said lid.

* * * * *